US008699315B2

(12) United States Patent
Ihm et al.

(10) Patent No.: US 8,699,315 B2
(45) Date of Patent: Apr. 15, 2014

(54) APPARATUS AND METHOD FOR TRANSMITTING/RECEIVING SIGNALS BY USING A PRESET FRAME STRUCTURE IN A WIRELESS COMMUNICATION SYSTEM

(75) Inventors: Binchul Ihm, Anyang-si (KR); Wookbong Lee, Anyang-si (KR); Moonil Lee, Anyang-si (KR); Sunam Kim, Anyang-si (KP); Hyunsoo Ko, Anyang-si (KR); Sungho Park, Anyang-si (KR); Jaho Koo, Anyang-si (KR); Jinyoung Chun, Anyang-si (KR); Seunghyun Kang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 200 days.

(21) Appl. No.: 13/497,784

(22) PCT Filed: Sep. 20, 2010

(86) PCT No.: PCT/KR2010/006484
§ 371 (c)(1),
(2), (4) Date: Mar. 22, 2012

(87) PCT Pub. No.: WO2011/037396
PCT Pub. Date: Mar. 31, 2011

(65) Prior Publication Data
US 2013/0163484 A1 Jun. 27, 2013

Related U.S. Application Data

(60) Provisional application No. 61/245,653, filed on Sep. 24, 2009.

(30) Foreign Application Priority Data

Sep. 1, 2010 (KR) .................. 10-2010-0085371

(51) Int. Cl.
*H04J 11/00* (2006.01)
*H04Q 7/00* (2006.01)

(52) U.S. Cl.
USPC ............................................ 370/203; 370/328

(58) Field of Classification Search
USPC .......... 370/203, 280, 281, 294, 295, 328, 338
See application file for complete search history.

(56) References Cited

U.S. PATENT DOCUMENTS

2010/0103896 A1* 4/2010 Cho et al. .................. 370/329
2013/0077469 A1* 3/2013 Ma et al. .................. 370/210

FOREIGN PATENT DOCUMENTS

KR  1020080016390  2/2008
KR  1020090089767  8/2009

OTHER PUBLICATIONS

Motorola, "EUTRA Downlink Numerology", R1-050520, 3GPP TSG RAN1#41 Meeting, May 2005.

*Primary Examiner* — Hong Cho
(74) *Attorney, Agent, or Firm* — Lee, Hong, Degerman, Kang & Waimey

(57) ABSTRACT

The present invention relates to an apparatus and a method for transmitting/receiving signals by using a preset frame structure in a wireless communication system. As there are difficulties ensuring the link capacity and quality for a high speed moving object with the existing frame structure and the antenna arrangement and communication system based on the existing scheme, a new frame structure needs to be proposed. According to one example of those newly proposed frame structures, one frame is composed of 8 subframes, each of the 8 subframes being composed of orthogonal frequency division multiple access (OFDMA) symbols in a range of 11 to 14, and the cyclic prefix (CP) length of the frame is 1/8 or less of an effective symbol length (e.g., 1/8, 1/16, 1/31, 1/64).

20 Claims, 4 Drawing Sheets (a)

(b)

APPARATUS AND METHOD FOR TRANSMITTING/RECEIVING SIGNALS BY USING A PRESET FRAME STRUCTURE IN A WIRELESS COMMUNICATION SYSTEM

CROSS-REFERENCE TO RELATED APPLICATIONS

This application is the National Stage filing under 35 U.S.C. 371 of International Application No. PCT/KR2010/006484, filed on Sep. 20, 2010, which claims the benefit of earlier filing date and right of priority to Korean Application No. 10-2010-0085371, filed on Sep. 1, 2010, and also claims the benefit of U.S. Provisional Application Serial No. 61/245,653, filed on Sep. 24, 2009, the contents of which are all incorporated by reference herein in their entirety.

TECHNICAL FIELD

The present invention relates to a wireless communication system, and more particularly to an apparatus and method for transmitting/receiving signals using a preset frame structure in a wireless communication system.

BACKGROUND ART

A 4G cellular communication system which is currently discussed is designed on the basis of one basic frame, and is also designed to optimize throughput by targeting a user who moves at low speed. Although this 4G cellular communication system is designed to support even a user who moves at high speed of 350 km/h, throughput of such high speed is less than that of low speed.

If the cellular communication system is applied to a high-speed train, link quality between a network and the high-speed train is deteriorated due to high mobility of the high-speed train of which speed is 350 km/h, and it is difficult to obtain sufficient link capacity.

In this respect, if the speed of the high-speed train exceeds 500 km/h in accordance with the development of technology, it is expected that throughput degradation may be more serious and quality of wireless data service for passengers will be deteriorated significantly. Also, the high-speed train may partially use capacity of a macro base station. In this case, it may deteriorate data communication of other users within a cell.

Meanwhile, wire communication not wireless communication may be used for communication between the network and the high-speed train. For example, although communication between the high-speed train and the network is performed through an alternating current signal by using tracks in contact with the high-speed train, such a system has problems in that capacity of the tracks is low and it is difficult to obtain more links due to physical restriction that the number of tracks for simultaneous access is limited to 2.

Likewise, although there may be provided a power line communication (PLC) system that performs communication using a power line, this system has the same problems as those of the system based on the tracks and also has a problem in that it cannot be applied to a train having no power line.

As described above, problems occur in that link capacity and quality cannot be ensured for a high-speed vehicle which moves at high speed, by the existing frame structure, the existing antenna arrangement, and the existing communication system. However, solutions for the problems have not been studied or suggested until now.

DISCLOSURE

Technical Problem

Accordingly, an object of the present invention devised to solve the conventional problem is to provide a method for transceiving (transmitting/receiving) signals using a preset frame structure in a wireless communication system.

Another object of the present invention is to provide an apparatus for transceiving (transmitting/receiving) signals using a preset frame structure in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one embodiment of the present invention, a method for transceiving signals by using a preset frame structure in a wireless communication system comprises the step of transceiving signals through a frame based on the preset frame structure, wherein one frame in the preset frame structure includes eight subframes, each of the eight subframes includes eleven to fourteen orthogonal frequency division multiple access (OFDMA) symbols, and a cyclic prefix (CP) time of the frame is equal to 1/8 or less than 1/8 of a useful symbol time.

The frame may be a time division duplex (TDD) frame or a frequency division duplex (FDD) frame.

In the above method, the FDD frame includes seven type-5 subframes and one type-6 subframe when the CP time is 1/8 of the useful symbol time, and each of the type-5 subframes includes twelve OFDMA symbols, and the type-6 subframe includes thirteen OFDMA symbols.

In the above method, the FDD frame includes two type-5 subframes and six type-6 subframes when the CP time is 1/16 of the useful symbol time, and each of the type-5 subframes includes twelve OFDMA symbols, and each of the type-6 subframes includes thirteen OFDMA symbols.

In the above method, the FDD frame includes six type-6 subframes and two type-7 subframes when the CP time is 1/32 of the useful symbol time, and each of the type-6 subframes includes thirteen OFDMA symbols, and each of the type-7 subframes includes fourteen OFDMA symbols.

In the above method, the FDD frame includes five type-6 subframes and three type-7 subframes when the CP time is 1/64 of the useful symbol time, and each of the type-6 subframes includes thirteen OFDMA symbols, and each of the type-7 subframes includes fourteen OFDMA symbols.

In the above method, the TDD frame includes eight type-5 subframes, or includes one type-4 subframe and seven type-6 subframes when the CP time is 1/8 of the useful symbol time, and each of the type-4 subframes, the type-5 subframes and the type-6 subframes includes eleven, twelve and thirteen OFDMA symbols, respectively.

In the above method, the TDD frame includes three type-5 subframes and five type-6 subframes, or includes four type-5 subframes and four type-6 subframes when the CP time is 1/16 of the useful symbol time, and each of the type-5 subframes includes twelve OFDMA symbols, and each of the type-6 subframes includes thirteen OFDMA symbols.

In the above method, the TDD frame includes seven type-6 subframes and one type-7 subframe, or includes eight type-6 subframes when the CP time is 1/32 of the useful symbol time, and each of the type-6 subframes includes thirteen OFDMA symbols, and each of the type-7 subframes includes fourteen OFDMA symbols.

In the above method, the TDD frame includes six type-6 subframes and two type-7 subframes, or includes seven type-6 subframes and one type-7 subframe when the CP time is 1/64 of the useful symbol time, and each of the type-6 subframes includes thirteen OFDMA symbols, and each of the type-7 subframes includes fourteen OFDMA symbols.

To solve the aforementioned technical problems, according to another embodiment of the present invention, an apparatus for transceiving signals using a preset frame structure in a wireless communication system comprises a processor configured to control operation to transceive signals through a frame based on the preset frame structure, wherein the preset frame structure is configured that one frame includes eight subframes, each of which includes eleven to fourteen orthogonal frequency division multiple access (OFDMA) symbols, and a cyclic prefix (CP) time of the frame is less than 1/8 of a useful symbol time.

To solve the aforementioned technical problems, according to still another embodiment of the present invention, a method for transceiving signals using a preset frame structure in a wireless communication system comprises the step of transceiving signals through a frame based on the preset frame structure, wherein one frame in the frame structure includes sixteen subframes, each of the sixteen subframes is any one of a type-1 subframe comprised of six OFDMA symbols, a type-2 subframe comprised of seven OFDMA symbols and a type-3 subframe comprised of five OFDMA symbols, and a cyclic prefix (CP) time of the frame is equal to 1/8 or less than 1/8 of a useful symbol time.

To solve the aforementioned technical problems, according to further still another embodiment of the present invention, an apparatus for transceiving signals using a preset frame structure in a wireless communication system comprises a processor configured to control operation to transceive signals through a frame based on the preset frame structure, wherein the processor performs a control operation such that one frame includes sixteen subframes, each of the sixteen subframes is any one of a type-1 subframe comprised of six OFDMA symbols, a type-2 subframe comprised of seven OFDMA symbols and a type-3 subframe comprised of five OFDMA symbols, and a cyclic prefix (CP) time of the frame is equal to 1/8 or less than 1/8 of a useful symbol time.

To solve the aforementioned technical problems, according to further still another embodiment of the present invention, a method for transceiving signals using a preset frame structure in a wireless communication system comprises the step of transceiving signals through a frame based on the preset frame structure, wherein one frame in the frame structure includes ten subframes, each of the ten subframes includes two slots, an interval between subcarriers is set to 30 Hz, each slot includes fifteen orthogonal frequency division multiple access (OFDMA) symbols, an OFDMA symbol duration except for a cyclic prefix (CP) time of the frame is 1024Ts (in this case, Ts=1/(15000×2048) seconds), and the frame has a CP time of 0.

To solve the aforementioned technical problems, according to further still another embodiment of the present invention, an apparatus for transceiving signals using a preset frame structure in a wireless communication system comprises a processor configured to control operation to transceive signals through a frame based on the preset frame structure, wherein the preset frame structure is configured that one frame includes ten subframes, each of the ten subframes includes two slots, an interval between subcarriers is set to 30 Hz, each slot includes fifteen orthogonal frequency division multiple access (OFDMA) symbols, an OFDMA symbol duration except for a cyclic prefix (CP) time of the frame is 1024Ts (in this case, Ts=1/(15000×2048) seconds), and the frame has a CP time of 0.

Advantageous Effects

In case that signals are transmitted and received using a frame structure according to the present invention, a communication service of good quality that ensures link capacity and quality may be provided to users who move at high speed.

As the frame structure according to the present invention is used, communication throughput of users who move at high speed is improved.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on a mobile communication system of a 3GPP LTE system, the following description may be applied to other mobile communication systems except for unique features of the 3GPP LTE system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Furthermore, in the following description, it is assumed that a mobile terminal means a mobile or fixed type such as a user equipment (UE), a mobile station (MS) and an advanced mobile station (AMS). It is also assumed that a base station means a random node of a network node, such as Node B, eNode B (eNB) and access point (AP), which performs communication with a mobile station.

In the mobile communication system, a user equipment may receive information from a base station through a downlink. Also, the user equipment may transmit information through an uplink. Examples of information transmitted from and received by the user equipment include data and various kinds of control information. Various physical channels exist depending on types of information transmitted from or received by the user equipment.

Figure 1:
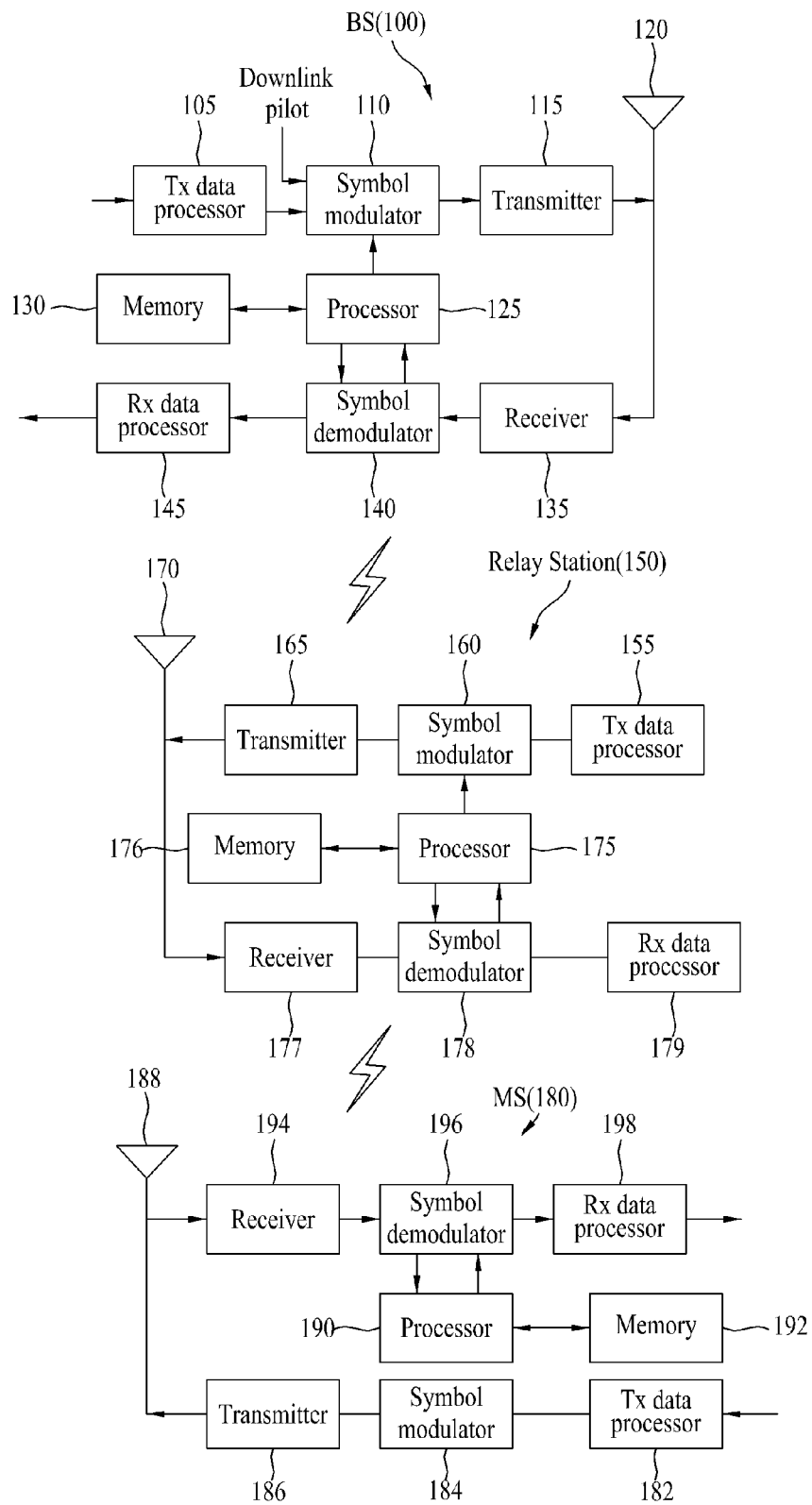
FIG. 1 is a block diagram illustrating a configuration of a communication system according to the present invention.

FIG. 1 is a block diagram illustrating a configuration of a communication system according to the present invention.

The communication system according to the present invention may include a base station 100, a relay station 150, a mobile station 180, and a network (not shown). Although one base station 100, one relay station 150, and one mobile station 180 are shown for simplification of the communication system, the wireless communication system according to the present invention may include a plurality of base stations, a plurality of relay stations, and a plurality of mobile stations.

Referring to FIG. 1, the base station 100 may include a transmitting (Tx) data processor 105, a symbol modulator 110, a transmitter 115, a transmitting and receiving antenna 120, a processor 125, a memory 130, a receiver 135, a symbol demodulator 140, and a receiving (Rx) data processor 145. The relay station 150 may include a Tx data processor 155, a symbol modulator 160, a transmitter 165, and an Rx data processor 179. Also, the mobile station 180 may include a Tx data processor 182, a symbol modulator 184, a transmitter 186, a transmitting and receiving antenna 188, a processor 190, a memory 192, a receiver 194, a symbol demodulator 196, and an Rx data processor 198.

Although the antennas 120, 170 and 188 are respectively shown in the base station 100, the relay station 150 and the mobile station 180, each of the base station 100, the relay station 150 and the mobile station 180 includes a plurality of antennas. Accordingly, the base station 100, the relay station 150 and the mobile station 180 according to the present invention support a multiple input multiple output (MIMO) system. The base station 100, the relay station 150 and the mobile station 180 according to the present invention may support both a single user-MIMO (SU-MIMO) system and a multi user-MIMO (MU-MIMO) system.

On a downlink, the Tx data processor 105 of the base station 100 receives traffic data, formats and codes the received traffic data, interleaves and modulates (or symbol maps) the coded traffic data, and provides modulated symbols ("data symbols"). The symbol modulator 110 receives and processes the data symbols and pilot symbols and provides streams of the symbols.

The symbol modulator 110 of the base station 100 multiplexes the data and pilot symbols and transmits the multiplexed data and pilot symbols to the transmitter 115. At this time, the respective transmitted symbols may be a signal value of zero, the data symbols and the pilot symbols. In each symbol period, the pilot symbols may be transmitted continuously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 115 of the base station 100 receives the streams of the symbols and converts the received streams into one or more analog symbols. Also, the transmitter 115 of the base station 100 generates downlink signals suitable for transmission through a radio channel by additionally controlling (for example, amplifying, filtering and frequency upconverting) the analog signals. Subsequently, the downlink signals are transmitted to the mobile station through the antenna 120.

The receiving antenna 170 of the relay station 150 may receive the downlink signals from the base station 100. The processor 175 of the relay station 150 may demodulate and process the downlink signals received from the base station 100 and then transmit the processed downlink signals to the mobile station 100 through the transmitting antenna 170. Also, the receiving antenna 170 of the relay station 150 may receive uplink signals from the mobile station 110. The processor 175 of the relay station 150 may demodulate and process the uplink signals from the mobile station 110 and then transmit the processed uplink signals to the base station 110.

The antenna 188 of the mobile station 180 receives the downlink signals from the base station 100 or the relay station 150 and provides the received signals to the receiver 194. The receiver 194 controls (for example, filters, amplifies and frequency downcoverts) the received signals and digitalizes the controlled signals to acquire samples. The symbol demodulator 196 demodulates the received pilot symbols and provides the demodulated pilot symbols to the processor 190 to perform channel estimation.

Also, the symbol demodulator 196 receives a frequency response estimation value for the downlink from the processor 190, acquires data symbol estimation values (estimation values of the transmitted data symbols) by performing data demodulation for the received data symbols, and provides the data symbol estimation values to the Rx data processor 198. The Rx data processor 198 demodulates (i.e., symbol demapping), deinterleaves, and decodes the data symbol estimation values to recover the transmitted traffic data.

Processing based on the symbol demodulator 196 and the Rx data processor 198 is complementary to processing based on the symbol demodulator 110 and the Tx data processor 105 at the base station 100.

On an uplink, the Tx data processor 182 of the mobile station 180 processes traffic data and provides data symbols. The symbol modulator 184 receives the data symbols, multiplexes the received data symbols with the pilot symbols, performs modulation for the multiplexed symbols, and provides the streams of the symbols to the transmitter 186. The transmitter 186 receives and processes the streams of the symbols and generates uplink signals. The uplink signals are transmitted to the base station 100 or the relay station 150 through the antenna.

The uplink signals are received in the base station 100 from the mobile station 180 through the antenna 120, and the receiver 190 processes the received uplink signals to acquire samples. Subsequently, the symbol demodulator 196 processes the samples and provides data symbol estimation values and the pilot symbols received for the uplink. The Rx data processor 198 recovers the traffic data transmitted from the mobile station 180 by processing the data symbol estimation values.

The processors 125, 175, and 190 of the base station 100, the relay station 150 and the mobile station 180 respectively command (for example, controls, adjusts, manages, etc.) the operation at the base station 100, the relay station 150 and the mobile station 180. The processors 125, 175 and 190 may respectively be connected with the memories 130, 176 and 192 that store program codes and data. The memories 130, 176 and 192 respectively connected to the processors 125, 175 and 190 store operating system, application, and general files therein.

Each of the processors 125, 175 and 190 may be referred to as a controller, a microcontroller, a microprocessor, and a microcomputer. Meanwhile, the processors 125, 175 and 190 may be implemented by hardware (or firmware), software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 125, 175 and 190.

Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 125, 175 and 190, or may be stored in the memories 130, 176 and 192 and driven by the processors 125, 175 and 190.

Layers of a radio interface protocol between the base station 100, the relay station 150 or the mobile station 180 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the mobile station 180 and the network. The base station 100, the relay station 150 and the mobile station 180 exchange RRC messages with one another through the RRC layer.

Examples of communication methods that may be used by passengers of a high-speed train may include a method for allowing a passenger to directly access a mobile communication network and a method for allowing a passenger to access a network through a relay which is a high-speed train. As compared with the former method, the latter method may reduce the number of handover times and allow more data to be exchanged between the relay and the passenger through a more improved method such as closed loop-MIMO (CL-MIMO) because there is no relay speed between the relay and the passenger. In this specification, in case that the high-speed train serves as a bridge for data communication between the network and the passenger in the same manner as the latter method, a method for maximizing link capacity between the network and the high-speed train will be suggested.

Hereinafter, a communication system of which physical channel condition is artificially modified to increase link capacity between the network and the high-speed train will be suggested and a frame structure suitable for the communication system will be suggested.

Figure 2:
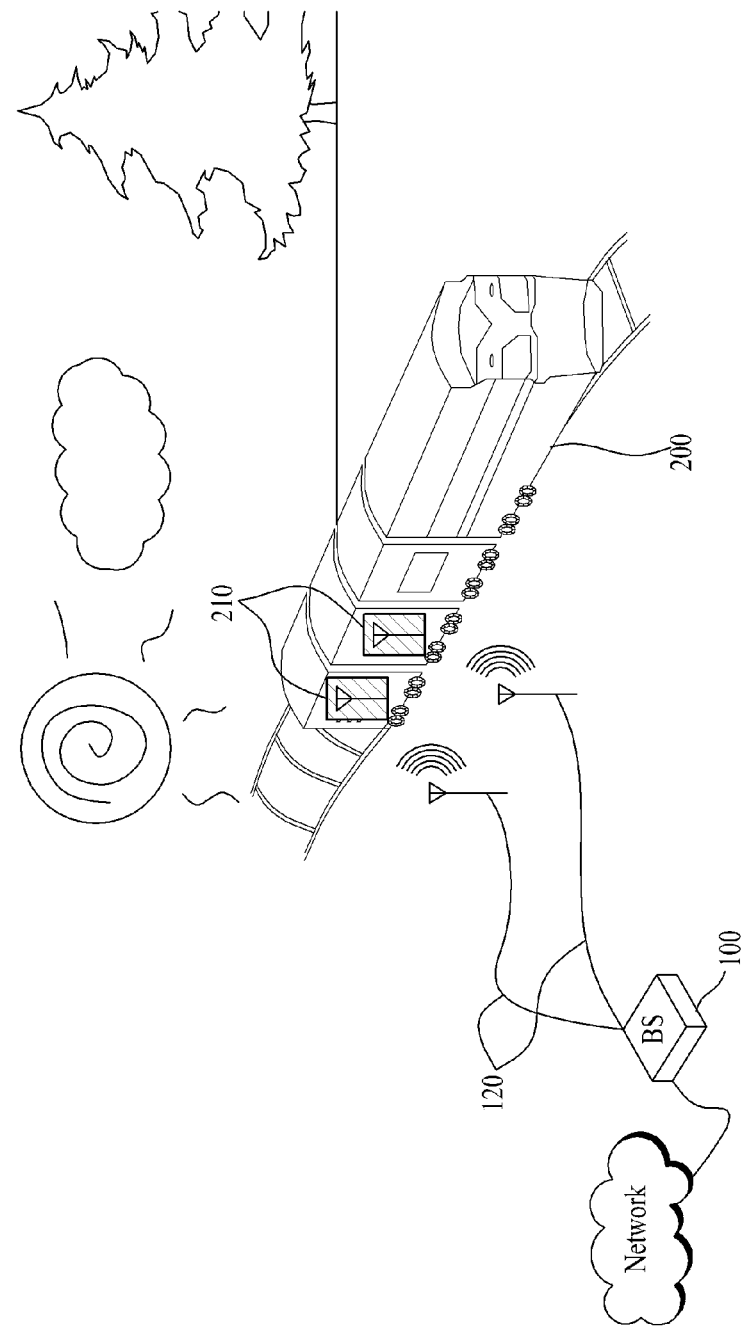
FIG. 2 is a diagram illustrating an example of a communication system according to the present invention.

FIG. 2 is a diagram illustrating an example of a communication system according to the present invention.

Referring to FIG. 2, the communication system includes a network and a base station 100 connected with the network. In this case, the base station 100 may be various types such as access point (AP), macro cell base station (Macrocell BS) and femto cell base station (Femtocell BS). The base stations may be arranged at predetermined intervals along a track or railroad of a high-speed vehicle 200 (hereinafter, high-speed train will be described as an example of the high-speed vehicle). The base station 100 that covers a specific zone may include a plurality of antennas.

Recently, a MIMO system has received much attention as a broadband wireless communication technology. The MIMO system means a system that enhances communication efficiency of data by using a plurality of antennas. The MIMO system may be divided into a spatial multiplexing (SM) scheme and a spatial diversity (SD) scheme depending on transmission of same data. The spatial multiplexing scheme means a scheme that may transmit data at high rate without even increasing a system bandwidth by simultaneously transmitting different data through a plurality of transmitting antennas. The spatial diversity scheme means a scheme that may obtain transmission diversity by transmitting same data from a plurality of transmitting antennas. An example of the spatial diversity scheme includes a space time channel coding scheme.

Also, the MIMO system may be divided into an open loop system and a closed loop system depending on feedback of channel information from a receiving side to a transmitting side. An example of the open loop system includes a space-time trellis code (STTC) system in which a transmitting side transmits information in parallel while a receiving side detects a signal by repeatedly using a zero forcing (ZF) scheme and a minimum mean square error (MMSE) scheme and obtains transmission diversity and encoding gain by using a blast and spatial area that can increase information as much as the number of transmitting antennas. An example of the closed loop system includes a transmit antenna array (TxAA) system.

In case that a vehicle length is sufficiently long like the high-speed train 200, a plurality of receiving antennas may be arranged as shown in FIG. 2. As the antennas 120 of the base station 100 are distributed, the base station 100 may control a transmission power of each transmitting antenna (or transmitting antenna group) to allow one transmitting antenna (or transmitting antenna group) to affect only one receiving antenna (or receiving antenna group) 210 of the high-speed train 200. In this case, since spatial multiplexing ratings are increased as much as the number of transmitting antennas (or transmitting antenna groups), link of large capacity between the base station 100 and the high-speed train 200 may be obtained.

One antenna (or one antenna group) of the high-speed train 200 and one antenna (or one antenna group) of the base station 100 may form a link of 1:1. The transmitting antenna group of the base station 100 may be comprised of one or more physical antennas. The same pilot structure and sequence are shared between the transmitting antenna groups. The receiving antenna group of the high-speed train 200 may be comprised of one or more physical antennas. At this time, one receiving antenna group may be arranged per vehicle of the high-speed train 200.

If the distance between the base station 100 and the high-speed train is short and LOS environment is general, a frame structure previously defined and suggested should newly be redefined to be optimized for the channel environment. The frame structure of the IEEE 802.16e, the IEEE 802.16m, the 3GPP LTE and the 3GPP LTE-A system of the related art are as shown in FIG. 3.

Figure 3:
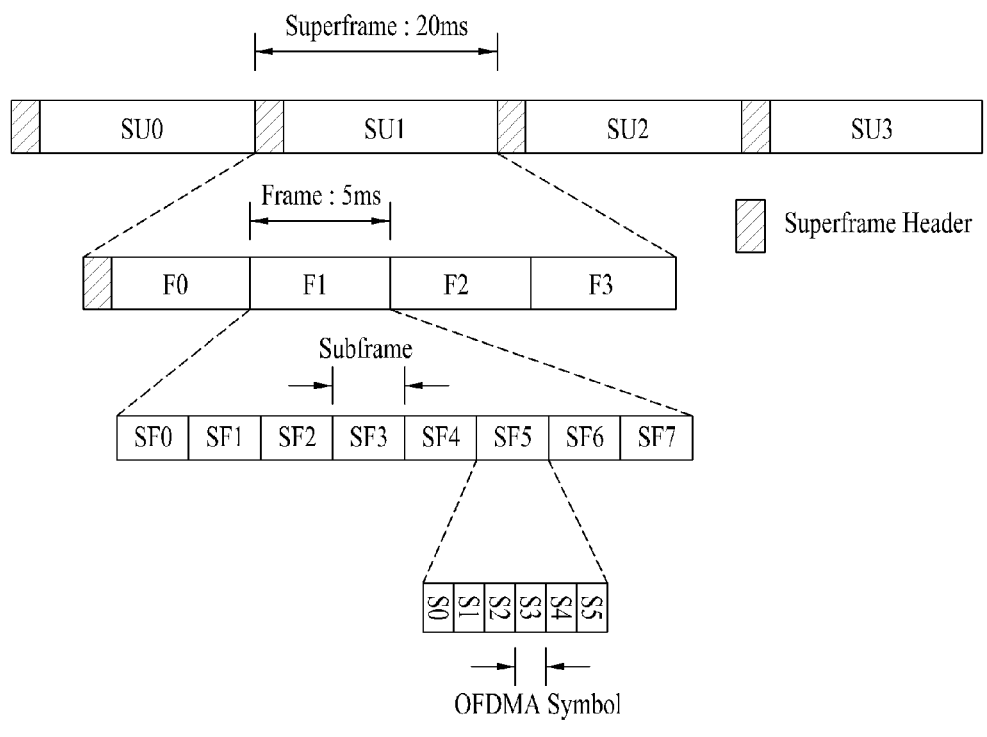
FIG. 3(a) is a diagram illustrating an example of a frame structure of an IEEE 802.16m system.
FIG. 3(b) is a diagram illustrating an example of a frame structure of a 3GPP LTE system.
Figure 3:
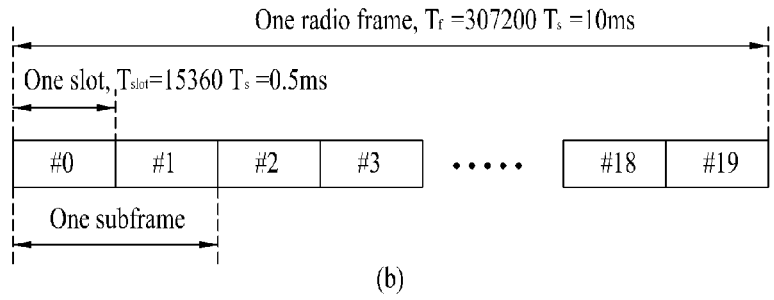

FIG. 3(*a*) is a diagram illustrating an example of a frame structure of an IEEE 802.16m system, and FIG. 3(*b*) is a diagram illustrating an example of a frame structure of a 3GPP LTE system.

Referring to FIG. 3(a), a frame in the IEEE 802.16m system which is one of an advanced air interface (AAI) system includes a plurality of subframes, each of which includes a plurality of subcarriers on a frequency axis and a plurality of OFDM symbols on a time axis. Some of a plurality of subframes included in one frame are used to transmit uplink data and the other subframes are used to transmit downlink data. Each superframe of 20 ms is divided into four frames, each of which has a size of 5 ms. The frame of 5 ms has one channel bandwidth among 5 MHz, 10 MHz and 20 MHz, and a radio frame of 5 ms may include seven or eight subframes depending on the channel bandwidth.

The base station 100 may transmit system information and control information to the mobile station 180 by using the control channel in the frame structure, and may transmit data in a frame region except for the other control channel. Examples of the control channels through which the base station 100 transmit control information to the mobile station 180 may include a superframe header (SFH) and an advanced-MAP (A-MAP). The superframe header includes a primary superframe header (P-SFH) and a secondary superframe header (S-SFH). The superframe header is the channel used to broadcast system information essentially or additionally required for the mobile station 180. In other words, the base station 100 may assist the mobile station 180 by transmitting the superframe header to the mobile station 180 when the mobile station 180 is powered on and initially enters the network or reenters the network, or when the mobile station 180 performs handover while moving.

Referring to FIG. 3(b), in the 3GPP LTE system, one radio frame has a length of 10 ms (327200×$T_s$) and includes ten (10) subframes of an equal size. Each sub frame has a length of 1 ms and includes two slots. Each slot has a length of 0.5 ms (15360×$T_s$). In this case, $T_s$ represents a sampling time, and is expressed by $T_s=1/(15 \text{ kHz}\times2048)=3.2552\times10^{-8}$(about 33 ns). The slot includes a plurality of orthogonal frequency division multiplexing (OFDM) symbols or single carrier-frequency division multiple access (SC-FDMA) symbols in a time domain, and includes a plurality of resource blocks (RBs) in a frequency domain.

In the LTE system, one resource block includes twelve (12) subcarriers×seven (or six) OFDM symbols or SC-FDMA symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols or SC-FDMA symbols included in the slot.

The existing frame structure includes superframes, frames, subframes and slots in common along the time axis and has a minimum unit structure of resource block (RB) or resource unit (RU) on the frequency axis, wherein the RB or RU is a set of a plurality of subcarriers. In the existing frame structure, cyclic prefix (CP) is used per OFDM symbol to prevent signal distortion from occurring due to multipath delay in the communication between the base station 100 and the mobile station 180.

In the 3GPP LTE system, the IEEE 802,16m system, etc., which are examples of the mobile communication system, an orthogonal frequency division multiplexing (OFDM) system is used as a multiplexing carrier modulation system. Hereinafter, the basic principle of the OFDM system will be described in brief.

In the OFDM system, data stream having a high rate is divided into a large number of data streams having a slow rate. This is to simultaneously transmit the data streams by using a plurality of carriers. Each of the plurality of carriers is referred to as a subcarrier. Since orthogonality exists among the carriers in the OFDM system, frequency components of the carriers may be detected by a receiving side even in the case that frequency components of the carriers overlap with one another. The data stream having the high rate may be converted into a plurality of data streams having the slow rate by a serial-to-parallel converter, each of the plurality of data streams converted in parallel may be multiplied by each of the subcarriers, the data streams may be added to one another, and the added data streams may be transmitted to the receiving side.

The plurality of parallel data streams generated by the serial-to-parallel converter may be transmitted to the plurality of subcarriers through Inverse Discrete Fourier Transform (IDFT). In this case, the IDFT may be efficiently implemented using Inverse Fast Fourier Transform (IFFT). Since a symbol duration of each of the subcarriers having the slow rate is increased, relative signal dispersion on a time axis, which is generated by multipath delay spread, is decreased.

In the wireless communication using such an OFDM system, inter-symbol interference may be reduced in such a manner that a guard interval longer than delay spread of a channel is inserted between the symbols. In other words, while each symbol is being transmitted through a multipath channel, a guard interval longer than maximum delay spread of a channel is inserted between contiguous symbols. At this time, in order to prevent inter-subcarrier orthogonality from being destroyed, a signal of the last interval (i.e., guard interval) of a useful symbol interval is copied and arranged at a start part of a symbol. This will be referred to as cyclic prefix (CP).

Figure 4:
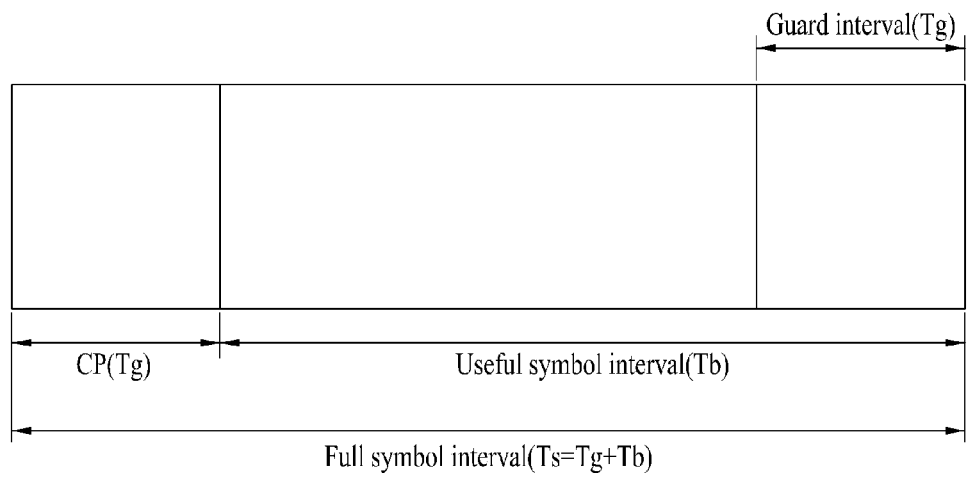
FIG. 4 is a diagram illustrating an example of a symbol structure, which includes cyclic prefix (CP), in a mobile communication system.

FIG. 4 is a diagram illustrating an example of a symbol structure that includes a cyclic prefix (CP) in a mobile communication system.

Referring to FIG. 4, a symbol duration (Ts) becomes a sum of a useful symbol interval ($T_b$) and a guard interval (TO, wherein actual data are transmitted to the useful symbol interval. The receiving side performs demodulation by selecting data corresponding to the useful symbol interval after removing the guard interval (TO. The transmitting side and the receiving side may be synchronized with each other using a cyclic prefix symbol, and may maintain orthogonality between data symbols.

However, in antenna arrangement considered by the present invention, since the distance between the transmitting and receiving antennas is very short and LOS environment is maintained, signal distortion due to delay does not occur even if CP is removed. Accordingly, a new frame structure that maintains commonality with the existing frame structure if possible but obtains more resources to remove CP included in the existing frame structure or reduce CP length (or cp time) will be suggested. Since a minimum unit of scheduling is a subframe unit in both the IEEE 802.16m system and the LTE/LTE-A system, it is preferable that the subframe length is maintained at 5 ms and 1 ms.

A frame structure that removes or reduces the CP to adapt to the channel environment considered by the present invention will be suggested on the basis of the frame structure of the 3GPP LTE or LTE-A system. LTE (frame structure type 1) based frame structure for LOS channel and short distance will be described.

In the frame structure of the LTE system, one frame includes ten subframes, each of which includes two slots. In case of normal CP, one slot includes seven OFDMA symbols, and the CP length (or CP time) is 160Ts at the first OFDMA symbol of the slot and 144Ts at the other six OFDMA symbols of the slot. In this case, Ts (=1/(15000×2048) seconds) is a basic time unit. In this frame structure, $\Delta f$ (subcarrier interval) is 15 kHz. Considering Doppler shift of the high-speed train, it is preferable that $\Delta f$ is increased to 30 kHz and orthogonality between subcarriers of OFDM is obtained. Although $\Delta f$ may be increased to a predetermined multiple value more than a value defined in the existing frame structure, it is preferable that $\Delta f$ is increased to two times to use a sampler previously implemented. If $\Delta f$ is increased to four times of the value defined in the existing frame structure, a problem occurs in that CP should be added per symbol.

As described above, in case that the subcarrier interval $\Delta f$ is increased to two times of the subcarrier interval in the existing frame structure to configure a new frame structure, physical parameters and slots/subframes will be redefined on the basis of $\Delta f$, as follows. The following Table 1 illustrates physical parameters newly defined when $\Delta f$ is 30 KHz corresponding to two times of the existing value.

TABLE 1

| Parameters | Contents |
| --- | --- |
| The number of OFDM symbols per slot | 14 |
| duration of one OFDM symbol without CP | 1024Ts |
| CP size (or time) | CP of one OFDM symbol of 14 OFDM symbols is 88Ts and CP of the other OFDM symbols is 72Ts. |

TABLE 1-continued

| Parameters | Contents |
| --- | --- |
| $N_{FFT}$ size per bandwidth | (BW: $N_{FFT}$) = (5 MHz: 256), (10 MHz: 512), (20 MHz: 1024), (40 MHz: 2048) In this case, $N_{FFT}$ is FFT (Fast Fourier Transform) size. |

Unlike Table 1, in case of $\Delta f=30$ kHz, the physical parameters may be defined as expressed in Table 2 below.

TABLE 2

| Parameters | Contents |
| --- | --- |
| The number of OFDM symbols per slot | 15 |
| duration of one OFDM symbol without CP | 1024Ts |
| CP size (or time) | 0 |
| $N_{FFT}$ size per bandwidth | (BW: $N_{FFT}$) = (5 MHz: 256), (10 MHz: 512), (20 MHz: 1024), (40 MHz: 2048) In this case, $N_{FFT}$ is FFT (Fast Fourier Transform) size. |

Next, a frame structure when CP is removed to adapt to a channel environment considered by the present invention will be suggested on the basis of the frame structure. The IEEE 802.16m based frame structure for LOS channel and short distance will be described.

TABLE 3

| | | | The nominal channel bandwidth, BW (MHz) | | | | |
| --- | --- | --- | --- | --- | --- | --- | --- |
| | | | 5 | 7 | 8.75 | 10 | 20 |
| Sampling factor, n | | | 28/25 | 8/7 | 8/7 | 28/25 | 28/25 |
| Sampling frequency, $F_s$ (MHz) | | | 5.6 | 8 | 10 | 11.2 | 22.4 |
| FFT size, $N_{FFT}$ | | | 256 | 512 | 512 | 512 | 1024 |
| Subcarrier spacing, $\Delta f$ (kHz) | | | 21.88 | 15.63 | 19.53 | 21.88 | 21.88 |
| Useful symbol time, $T_b$ (µs) | | | 45.71 | 64 | 51.2 | 45.71 | 45.71 |
| CP ratio, G = 1/8 | OFDMA symbol time, Ts (µs) | | 51.429 | 72 | 57.6 | 51.429 | 51.429 |
| | FDD | No. of OFDMA symbols per 5 ms frame | 97 | 69 | 86 | 97 | 97 |
| | | Idle time (µs) | 11.429 | 32 | 46.4 | 11.429 | 11.429 |
| | TDD | No. of OFDMA symbols per 5 ms frame | 96 (or 95) | 68 (or 67) | 85 (or 84) | 96 (or 95) | 96 (or 95) |
| | | TTG + RTG (µs) | 62.857 (or 114.286) | 104 (or 176) | 104 (or 161.6) | 62.857 (or 114.286) | 62.857 (or 114.286) |
| CP ratio, G = 1/16 | OFDMA symbol time, Ts (µs) | | 48.571 | 68 | 54.4 | 48.571 | 48.571 |
| | FDD | No. of OFDMA symbols per 5 ms frame | 102 | 73 | 91 | 102 | 102 |
| | | Idle time (µs) | 45.714 | 36 | 49.6 | 45.714 | 45.714 |
| | TDD | No. of OFDMA symbols per 5 ms frame | 101 (or 100) | 72 (or 71) | 90 (or 89) | 101 (or 100) | 101 (or 100) |
| | | TTG + RTG (µs) | 94.286 (or 142.857) | 104 (or 172) | 104 (or 158.4) | 94.286 (or 142.857) | 94.286 (or 142.857) |

TABLE 3-continued

| | | The nominal channel bandwidth, BW (MHz) | | | | |
|---|---|---|---|---|---|---|
| | | 5 | 7 | 8.75 | 10 | 20 |
| CP ratio, G = 1/32 | OFDMA symbol time, Ts (μs) | 47.143 | 66 | 52.8 | 47.143 | 47.143 |
| | FDD No. of OFDMA symbols per 5 ms frame | 106 | 75 | 94 | 106 | 106 |
| | Idle time (μs) | 2.857 | 50 | 36.8 | 2.857 | 2.857 |
| | TDD No. of OFDMA symbols per 5 ms frame | 105 (or 104) | 74 (or 73) | 93 (or 92) | 105 (or 104) | 105 (or 104) |
| | TTG + RTG (μs) | 50 (or 97.143) | 116 (or 182) | 89.6 (or 142.4) | 50 (or 97.143) | 50 (or 97.143) |
| CP ratio, G = 1/64 | OFDMA symbol time, Ts (μs) | 46.429 | 65 | 52 | 46.429 | 46.429 |
| | FDD No. of OFDMA symbols per 5 ms frame | 107 | 76 | 96 | 107 | 107 |
| | Idle time (μs) | 32.143 | 60 | 8 | 32.143 | 32.143 |
| | TDD No. of OFDMA symbols per 5 ms frame | 106 (or 105) | 75 (or 74) | 95 (or 94) | 106 (or 105) | 106 (or 105) |
| | TTG + RTG (μs) | 78.571 (or 125) | 125 (or 190) | 60 (or 112) | 78.571 (or 125) | 78.571 (or 125) |

In Table 3, in order to provide a communication service of good throughput to the high-speed moving vehicle considering the environment of the high-speed vehicle which moves at high speed, the physical parameter values in the existing frame structure have been redefined. As the physical parameter values are newly designed, a subframe structure is varied. Hereinafter, a subframe structure depending on the newly defined physical parameter values will be described.

First of all, a subframe structure having a channel bandwidth of 5/10/20 MHz will be described.

In order to use hybrid automatic repeater request (HARQ) timing of the existing system, one frame may include eight subframes. In this case, the number of OFDMA (or OFDM) symbols constituting a new subframe may be expressed in Table 4 below. At this time, a type-4 subframe is defined as a subframe comprised of eleven OFDMA symbols, a type-5 subframe is defined as a subframe comprised of twelve OFDMA symbols, a type-6 subframe is defined as a subframe comprised of thirteen OFDMA symbols, and a type-7 subframe is defined as a subframe comprised of fourteen OFDMA symbols. The type-4 to type-7 subframes are only exemplary, and it is to be understood that the type-4 frame is not limited to eleven OFDMA symbols. The subframe type may be defined unlike the above definition.

TABLE 4

| | FDD | | | | TDD | | | |
|---|---|---|---|---|---|---|---|---|
| | Subframe type (Number of OFDMA symbols) | | | | | | | |
| | Type-4 (11) | Type-5 (12) | Type-6 (13) | Type-7 (14) | Type-4 (11) | Type-5 (12) | Type-6 (13) | Type-7 (14) |
| Number of subframe in a frame in case of G = 1/8 | 0 | 7 | 1 | 0 | 0 1 | 8 7 | 0 0 | 0 0 |
| Number of subframe in a frame in case of G = 1/16 | 0 | 2 | 6 | 0 | 0 0 | 3 4 | 5 4 | 0 0 |
| Number of subframe in a frame in case of G = 1/32 | 0 | 0 | 6 | 2 | 0 0 | 0 0 | 7 8 | 1 0 |

TABLE 4-continued

| | FDD | | | | TDD | | | |
|---|---|---|---|---|---|---|---|---|
| | Subframe type (Number of OFDMA symbols) | | | | | | | |
| | Type-4 (11) | Type-5 (12) | Type-6 (13) | Type-7 (14) | Type-4 (11) | Type-5 (12) | Type-6 (13) | Type-7 (14) |
| Number of subframe in a frame in case of G = 1/64 | 0 | 0 | 5 | 3 | 0 0 | 0 0 | 6 7 | 2 1 |

In Table 4, referring to the FDD frame, in case of a CP rate (G)=1/8, the FDD frame includes seven type-5 subframes and one type-6 subframe. In case of a CP rate (G)=1/16, the FDD frame includes two type-5 subframes and six type-6 subframes. Also, in case of CP rate (G)=1/32, the FDD frame includes six type-6 subframes and two type-7 subframes. Moreover, in case of a CP rate (G)=1/64, the FDD frame includes five type-6 subframes and three type-7 subframes.

Unlike the FDD frame, the TDD frame structure in Table 4 may be varied depending on whether cell radius is a large size or small size even though the CP rate (G) is uniformly provided. In case of a CP rate (G)=1/8, the TDD frame may include eight type-5 subframes in case of a small sized cell and one type-4 subframe and seven type-5 subframes in case of a large sized cell. In case of a CP rate (G)=1/16, the TDD frame may include three type-5 subframes and five type-6 subframes in case of a small sized cell and four type-sub-frames and four type-6 subframes in case of a large sized cell. Meanwhile, in case of a CP rate (G)=1/32, the TDD frame may include seven type-6 subframes and one type-7 subframe in case of a small sized cell and eight type-6 subframes in case of a large sized cell. Also, in case of a CP rate (G)=1/64, the TDD frame may include six type-6 subframes and two type-7 subframes in case of a small sized cell and seven type-6 subframes and one type-7 subframe in case of a large sized cell.

As another design method, it may be considered that one subframe basically includes six OFDMA symbols. In this case, a mapping rule and a permutation rule according to the existing system may be reused as they are, and one frame may include sixteen subframes. The frame may be configured as expressed in Table 5 below.

TABLE 5

| | FDD | | | TDD | | |
|---|---|---|---|---|---|---|
| | Subframe type (Number of OFDMA symbols) | | | | | |
| | Type-3 (5) | Type-1 (6) | Type-2 (7) | Type-3 (5) | Type-1 (6) | Type-2 (7) |
| Number of subframe in a frame in case G = 1/8 | | 15 | 1 | 1 | 16 15 | |
| Number of subframe in a frame in case G = 1/16 | | 10 | 6 | | 11 12 | 5 4 |
| Number of subframe in a frame in case G = 1/32 | | 6 | 10 | | 7 8 | 9 8 |
| Number of subframe in a frame in case G = 1/64 | | 5 | 11 | | 6 7 | 10 9 |

In Table 5, referring to the FDD frame, in case of a CP rate (G)=1/8, the FDD frame may include fifteen type-1 subframes and one type-2 subframe. In case of a CP rate (G)=1/16, the FDD frame may include ten type-1 subframes and six type-2 subframes. Also, in case of CP rate (G)=1/32, the FDD frame may include six type-1 subframes and ten type-2 subframes. Moreover, in case of CP rate (G)=1/64, the FDD frame may include five type-1 subframes and eleven type-2 subframes.

Unlike the FDD frame, the TDD frame structure in Table 5 will be described. As described in Table 4, the TDD frame may be varied depending on a cell radius (small sized cell or large sized cell). In case of a CP rate (G)=1/8, the TDD frame may include sixteen type-1 subframes in case of a small sized cell and fifteen type-1 subframe and one type-3 subframe in case of a large sized cell. In case of a CP rate (G)=1/16, the TDD frame may include eleven type-1 subframes and five type-2 subframes in case of a small sized cell and twelve type-1 subframes and four type-2 subframes in case of a large sized cell. Also, in case of a CP rate (G)=1/32, the TDD frame may include seven type-1 subframes and nine type-2 subframe in case of a small sized cell and eight type-1 subframes and eight type-2 subframes in case of a large sized cell. Also, in case of CP rate (G)=1/64, the TDD frame may include six type-1 subframes and ten type-2 subframes in case of a small sized cell and seven type-1 subframes and nine type-2 subframe in case of a large sized cell.

First of all, a frame structure for a channel bandwidth of 7 MHz will be described.

In order to use HARQ timing of the existing system, one frame may include six subframes. In this case, the number of OFDMA symbols constituting a subframe may be expressed in Table 6 below. Table 6 illustrates types of new subframes constituting one frame and the number of the respective types.

TABLE 6

| | FDD | | | | TDD | | | |
|---|---|---|---|---|---|---|---|---|
| | Subframe type (Number of OFDMA symbols) | | | | | | | |
| | Type-4 (11) | Type-5 (12) | Type-6 (13) | Type-7 (14) | Type-4 (11) | Type-5 (12) | Type-6 (13) | Type-7 (14) |
| Number of subframe in a frame in case of G = 1/8 | 3 | 3 | 0 | 0 | 4 5 | 2 1 | 0 0 | 0 0 |
| Number of subframe in a frame in case of G = 1/16 | 0 | 5 | 1 | 0 | 0 1 | 6 5 | 0 0 | 0 0 |
| Number of subframe in a frame in case of G = 1/32 | 0 | 3 | 3 | 0 | 0 0 | 4 5 | 2 1 | 0 0 |
| Number of subframe in a frame in case of G = 1/64 | 0 | 2 | 4 | 0 | 0 0 | 3 4 | 3 2 | 0 0 |

In Table 6, referring to the FDD frame, in case of a CP rate (G)=1/8, the FDD frame includes three type-4 subframes and three type-5 subframes. In case of a CP rate (G)=1/16, the FDD frame includes five type-5 subframes and one type-6 subframe. Also, in case of a CP rate (G)=1/32, the FDD frame may include three type-5 subframes and three type-6 subframes. Moreover, in case of CP rate (G)=1/64, the FDD frame may include two type-5 subframes and four type-6 subframes.

Unlike the FDD frame, the TDD frame structure in Table 6 may be varied depending on whether a cell radius has a large size or a small size even though the CP rate (G) is uniformly provided. In case of a CP rate (G)=1/8, the TDD frame may include four type-4 subframes in case of a small sized cell and two type-5 subframes and five type-4 subframes and one type-5 subframe in case of a large sized cell. In case of a CP rate (G)=1/16, the TDD frame may include six type-5 subframes in case of a small sized cell and one type-4 subframe and five type-5 subframes in case of a large sized cell. Also, in case of a CP rate (G)=1/32, the TDD frame may include four type-5 subframes and two type-6 subframe in case of a small sized cell and five type-5 subframes and one type-6 subframe in case of a large sized cell. Also, in case of a CP rate (G)=1/64, the TDD frame may include three type-5 subframes and three type-6 subframes in case of a small sized cell and four type-5 subframes and two type-6 subframes in case of a large sized cell.

As another design method, it may be considered that one subframe basically includes six OFDMA symbols. In this case, a mapping rule and a permutation rule according to the existing system may be reused as they are, and one frame may include twelve subframes. The frame may be configured as expressed in Table 7 below. Table 7 illustrates types of new subframes constituting one frame and the number of the respective types.

TABLE 7

| | FDD | | | TDD | | |
|---|---|---|---|---|---|---|
| | Subframe type (Number of OFDMA symbols) | | | | | |
| | Type-3 (5) | Type-1 (6) | Type-2 (7) | Type-3 (5) | Type-1 (6) | Type-2 (7) |
| Number of subframe in a frame in case of G = 1/8 | 3 | 9 | | 4 5 | 8 7 | |
| Number of subframe in a frame in case of G = 1/16 | | 11 | 1 | 1 | 12 11 | |
| Number of subframe in a frame in case of G = 1/32 | | 9 | 3 | | 10 11 | 2 1 |
| Number of subframe in a frame in case of G = 1/64 | | 8 | 4 | | 9 10 | 3 2 |

In Table 7, referring to the FDD frame, in case of a CP rate (G)=1/8, the FDD frame may include nine type-1 subframes and three type-3 subframe. In case of a CP rate (G)=1/16, the FDD frame may include eleven type-1 subframes and one type-2 subframe. Also, in case of a CP rate (G)=1/32, the FDD frame may include nine type-1 subframes and three type-2 subframes. Moreover, in case of a CP rate (G)=1/64, the FDD frame may include eight type-1 subframes and four type-2 subframes.

Unlike the FDD frame, the TDD frame structure in Table 7 will be described. The TDD frame may be varied depending on a cell radius (small sized cell or large sized cell). In case of a CP rate (G)=1/8, the TDD frame may include eight type-1 subframes and four type-3 subframes in case of a small sized cell and seven type-1 subframes and five type-3 subframes in case of a large sized cell. In case of a CP rate (G)=1/16, the TDD frame may include twelve type-1 subframes in case of a small sized cell and eleven type-1 subframes and one type-3 subframe in case of a large sized cell. Also, in case of a CP rate (G)=1/32, the TDD frame may include ten type-1 subframes and two type-2 subframes in case of a small sized cell and eleven type-1 subframes and one type-2 subframe in case of a large sized cell. Also, in case of a CP rate (G)=1/64, the TDD frame may include nine type-1 subframes and three type-2 subframes in case of a small sized cell and ten type-1 subframes and two type-2 subframes in case of a large sized cell.

Next, a frame structure for a channel bandwidth of 8.75 MHz will be described. Table 8 illustrates types of subframes constituting one frame and the number of the respective types.

TABLE 8

| | FDD | | | | TDD | | | |
|---|---|---|---|---|---|---|---|---|
| | Subframe type (Number of OFDMA symbols) | | | | | | | |
| | Type-4 (11) | Type-5 (12) | Type-6 (13) | Type-7 (14) | Type-4 (11) | Type-5 (12) | Type-6 (13) | Type-7 (14) |
| Number of subframe in a frame in case of G = 1/8 | 0 | 5 | 2 | 0 | 0 0 | 6 7 | 1 0 | 0 0 |
| Number of subframe in a frame in case of G = 1/16 | 0 | 0 | 7 | 0 | 0 0 | 1 2 | 6 5 | 0 0 |
| Number of subframe in a frame in case of G = 1/32 | 0 | 0 | 4 | 3 | 0 0 | 0 0 | 5 6 | 2 1 |
| Number of subframe in a frame in case of G = 1/64 | 0 | 0 | 2 | 5 | 0 0 | 0 0 | 3 4 | 4 3 |

In Table 8, referring to the FDD frame, in case of a CP rate (G)=1/8, the FDD frame includes five type-5 subframes and two type-6 subframes. In case of a CP rate (G)=1/16, the FDD frame includes seven type-6 subframes. Also, in case of a CP rate (G)=1/32, the FDD frame may include four type-6 subframes and three type-7 subframes. Moreover, in case of a CP rate (G)=1/64, the FDD frame may include two type-6 subframes and five type-7 subframes.

Unlike the FDD frame, the TDD frame structure in Table 8 may be varied depending on whether a cell radius has a large size or a small size even though the CP rate (G) is uniformly provided. In case of a CP rate (G)=1/8, the TDD frame may include six type-5 subframes and one type-6 subframe in case of a small sized cell and seven type-5 subframes in case of a large sized cell. In case of a CP rate (G)=1/16, the TDD frame may include one type-5 subframe and six type-6 subframes in case of a small sized cell and two type-5 subframes and five type-6 subframes in case of a large sized cell. Meanwhile, in case of a CP rate (G)=1/32, the TDD frame may include five type-6 subframes and two type-7 subframe in case of a small sized cell and six type-6 subframes and one type-7 subframe in case of a large sized cell. Also, in case of a CP rate (G)=1/64, the TDD frame may include three type-6 subframes and four type-7 subframes in case of a small sized cell and four type-6 subframes and three type-7 subframes in case of a large sized cell.

As another design method, it may be considered that one subframe basically includes six OFDMA symbols. In this case, a mapping rule and a permutation rule according to the existing system may be reused as they are, and one frame may include fourteen subframes. The frame may be configured as expressed in Table 9 below. Table 9 illustrates types of new subframes constituting one frame and the number of the respective types.

TABLE 9

| | FDD | | | TDD | | |
|---|---|---|---|---|---|---|
| | Subframe type (No. of OFDMA symbols) | | | | | |
| | Type-3 (5) | Type-1 (6) | Type-2 (7) | Type-3 (5) | Type-1 (6) | Type-2 (7) |
| Number of subframe in a frame in case of G = 1/8 | | 12 | 2 | | 13 14 | 1 |
| Number of subframe in a frame in case of G = 1/16 | | 7 | 7 | | 8 9 | 6 5 |
| Number of subframe in a frame in case of G = 1/32 | | 4 | 10 | | 4 5 | 9 8 |
| Number of subframe in a frame in case of G = 1/64 | | 2 | 12 | | 3 4 | 11 10 |

In Table 9, referring to the FDD frame, in case of a CP rate (G)=1/8, the FDD frame may include twelve type-1 subframes and two type-2 subframes. In case of a CP rate (G)=1/16, the FDD frame may include seven type-1 subframes and seven type-2 subframe. Also, in case of a CP rate (G)=1/32, the FDD frame may include four type-1 subframes and ten type-2 subframes. Moreover, in case of a CP rate (G)=1/64, the FDD frame may include two type-1 subframes and twelve type-2 subframes.

Unlike the FDD frame, the TDD frame structure in Table 9 will be described. The TDD frame may be varied depending on a cell radius (small sized cell or large sized cell). In case of a CP rate (G)=1/8, the TDD frame may include eight type-1 subframes and six type-2 subframes in case of a small sized cell and nine type-1 subframes and five type-2 subframes in case of a large sized cell. In case of a CP rate (G)=1/16, the TDD frame may include twelve type-1 subframes in case of a small sized cell and eleven type-1 subframes and one type-3 subframe in case of a large sized cell. Also, in case of a CP rate (G)=1/32, the TDD frame may include four type-1 subframes and nine type-2 subframes in case of a small sized cell and five type-1 subframes and eight type-2 subframe in case of a large sized cell. Also, in case of a CP rate (G)=1/64, the TDD frame may include three type-1 subframes and eleven type-2 subframes in case of a small sized cell and four type-1 subframes and ten type-2 subframes in case of a large sized cell.

The base station 100, the relay station 180 and the mobile station 180 may transmit and receive signals to and from one another by using the frame structures newly configured in Table 3 to Table 9. As the new frame structures suggested in Table 3 to Table 9 are used, the distance between the base station 100 and the high-speed mobile vehicle becomes short and a communication service of higher throughput may be provided under the LOS environment.

Those skilled in the art will appreciate that the present invention may be carried out in other specific ways than those set forth herein without departing from the spirit and essential characteristics of the present invention. It is also obvious to those skilled in the art that claims that are not explicitly cited in each other in the appended claims may be presented in combination as an embodiment of the present invention or included as a new claim by a subsequent amendment after the application is filed.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Industrial Applicability

The apparatus and method for transmitting/receiving signals using a preset frame structure in a wireless communication system may be applied to various wireless communication systems such as 3GPP LTE, LTE-A and IEEE 802.

The invention claimed is:

1. A method for transceiving signals using a preset frame structure in a wireless communication system, the method comprising:
transceiving signals through a frame based on the preset frame structure,
wherein one frame in the preset frame structure includes eight subframes, each of the eight subframes includes eleven to fourteen orthogonal frequency division multiple access (OFDMA) symbols, and a cyclic prefix (CP) time of the frame is equal to 1/8 or less than 1/8 of a useful symbol time.

2. The method according to claim 1, wherein the frame is a time division duplex (TDD) frame or a frequency division duplex (FDD) frame.

3. The method according to claim 2, wherein the FDD frame includes seven type-5 subframes and one type-6 subframe when the CP time is 1/8 of the useful symbol time, and each of the type-5 subframes includes twelve OFDMA symbols, and the type-6 subframe includes thirteen OFDMA symbols.

4. The method according to claim 2, wherein the FDD frame includes two type-5 subframes and six type-6 subframes when the CP time is 1/16 of the useful symbol time, and each of the type-5 subframes includes twelve OFDMA symbols, and each of the type-6 subframes includes thirteen OFDMA symbols.

5. The method according to claim 2, wherein the FDD frame includes six type-6 subframes and two type-7 subframes when the CP time is 1/32 of the useful symbol time, and each of the type-6 subframes includes thirteen OFDMA symbols, and each of the type-7 subframes includes fourteen OFDMA symbols.

6. The method according to claim 2, wherein the FDD frame includes five type-6 subframes and three type-7 subframes when the CP time is 1/64 of the useful symbol time, and each of the type-6 subframes includes thirteen OFDMA symbols, and each of the type-7 subframes includes fourteen OFDMA symbols.

7. The method according to claim 2, wherein the TDD frame includes eight type-5 subframes, or includes one type-4 subframe and seven type-6 subframes when the CP time is 1/8 of the useful symbol time, and each of the type-4 subframes, the type-5 subframes and the type-6 subframes includes eleven, twelve and thirteen OFDMA symbols, respectively.

8. The method according to claim 2, wherein the TDD frame includes three type-5 subframes and five type-6 subframes, or includes four type-5 subframes and four type-6 subframes when the CP time is 1/16 of the useful symbol time, and each of the type-5 subframes includes twelve OFDMA symbols, and each of the type-6 subframes includes thirteen OFDMA symbols.

9. The method according to claim 2, wherein the TDD frame includes seven type-6 subframes and one type-7 subframe, or includes eight type-6 subframes when the CP time is 1/32 of the useful symbol time, and each of the type-6 subframes includes thirteen OFDMA symbols, and the type-7 subframe includes fourteen OFDMA symbols.

10. The method according to claim 2, wherein the TDD frame includes six type-6 subframes and two type-7 subframes, or includes seven type-6 subframes and one type-7 subframe when the CP time is 1/64 of the useful symbol time, and each of the type-6 subframes includes thirteen OFDMA symbols, and the type-7 subframe includes fourteen OFDMA symbols.

11. A method for transceiving signals using a preset frame structure in a wireless communication system, the method comprising:
transceiving signals through a frame based on the preset frame structure,
wherein one frame in the preset frame structure includes sixteen subframes, each of the sixteen subframes is any one of a type-1 subframe comprised of six OFDMA symbols, a type-2 subframe comprised of seven OFDMA symbols and a type-3 subframe comprised of five OFDMA symbols, and a cyclic prefix (CP) time of the frame is equal to 1/8 or less than 1/8 of a useful symbol time.

12. The method according to claim 11, wherein the frame is a time division duplex (TDD) frame or a frequency division duplex (FDD) frame.

13. The method according to claim 12, wherein the FDD frame includes fifteen type-1 subframes and one type-2 subframe when the CP time is 1/8 of the useful symbol time.

14. The method according to claim 12, wherein the FDD frame includes ten type-1 subframes and six type-2 subframes when the CP time is 1/16 of the useful symbol time.

15. The method according to claim 12, wherein the TDD frame includes sixteen type-1 subframes, or includes fifteen type-1 subframes and one type-3 subframe when the CP time is 1/8 of the useful symbol time.

16. The method according to claim 12, wherein the TDD frame includes eleven type-1 subframes and five type-2 subframes, or includes twelve type-1 subframes and four type-2 subframes when the CP time is 1/16 of the useful symbol time.

17. The method according to claim 12, wherein the TDD frame includes seven type-1 subframes and nine type-2 subframes, or includes eight type-1 subframes and eight type-2 subframes when the CP time is 1/32 of the useful symbol time.

18. The method according to claim 12, wherein the TDD frame includes six type-1 subframes and ten type-2 subframes, or includes seven type-1 subframes and nine type-2 subframes when the CP time is 1/64 of the useful symbol time.

19. An apparatus for transceiving signals using a preset frame structure in a wireless communication system, the apparatus comprising:
a processor configured to control operation to transceive signals through a frame based on the preset frame structure,
wherein the preset frame structure is configured that one frame includes eight subframes, each of the eight subframes includes eleven, twelve, thirteen, or fourteen orthogonal frequency division multiple access (OFDMA) symbols, and a cyclic prefix (CP) time of the frame is equal to 1/8 or less than 1/8 of a useful symbol time.

20. An apparatus for transceiving signals using a preset frame structure in a wireless communication system, the apparatus comprising:
a processor configured to control operation to transceive signals through a frame based on the preset frame structure,
wherein the preset frame structure is configured that one frame includes sixteen subframes, each of the sixteen subframes is any one of a type-1 subframe comprised of six OFDMA symbols, a type-2 subframe comprised of seven OFDMA symbols and a type-3 subframe comprised of five OFDMA symbols, and a cyclic prefix (CP) time of the frame is equal to 1/8 or less than 1/8 of a useful symbol time.

* * * * *